(12) United States Patent
Van Der Velde et al.

(10) Patent No.: US 10,880,819 B2
(45) Date of Patent: Dec. 29, 2020

(54) SYSTEM INFORMATION PROVISION

(71) Applicant: Samsung Electronics Co., Ltd., Gyeonggi-do (KR)

(72) Inventors: Himke Van Der Velde, ZT Zwolle (NL); Gert Jan Van Lieshout, CG Apeldoorn (NL); Mangesh Abhimanyu Ingale, Bangalore (IN)

(73) Assignee: Samsung Electronics Co., Ltd

( * ) Notice: Subject to any disclaimer, the term of this patent is extended or adjusted under 35 U.S.C. 154(b) by 181 days.

(21) Appl. No.: 16/303,895

(22) PCT Filed: May 24, 2017

(86) PCT No.: PCT/KR2017/005416
§ 371 (c)(1),
(2) Date: Nov. 21, 2018

(87) PCT Pub. No.: WO2017/204559
PCT Pub. Date: Nov. 30, 2017

(65) Prior Publication Data
US 2020/0267629 A1    Aug. 20, 2020

(30) Foreign Application Priority Data

May 24, 2016   (IN) .............................. 201621017867
Aug. 3, 2016   (GB) ................................... 1613389.4

(51) Int. Cl.
*H04W 4/00*        (2018.01)
*H04W 48/12*       (2009.01)
(Continued)

(52) U.S. Cl.
CPC ........... *H04W 48/12* (2013.01); *H04W 48/10* (2013.01); *H04W 48/14* (2013.01); *H04W 88/02* (2013.01); *H04W 88/08* (2013.01)

(58) Field of Classification Search
USPC .................. 455/434; 370/328, 329; 375/276
See application file for complete search history.

(56) References Cited

U.S. PATENT DOCUMENTS

| | | | |
|---|---|---|---|
| 8,494,079 B2* | 7/2013 | Jung ....................... | H04W 8/26 375/276 |
| 9,370,024 B2* | 6/2016 | Park .................. | H04W 74/0833 |

(Continued)

OTHER PUBLICATIONS

NTT Docomo, Inc., "System Information Design for Standalone NR Operation", R2-163975, 3GPP TSG-RAN WG2 #94, May 23-27, 2016, 2 pages.

(Continued)

*Primary Examiner* — David Q Nguyen
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method of operating a base station in a wireless communications network, the base station being arranged to communicate with a mobile terminal to provide on-demand System Information, SI. The method comprises receiving a message from a mobile terminal requesting SI parameter values associated with a first identifier from two or more identifiers indicating corresponding sets of SI; and transmitting a response message including SI parameter values indicated by a first identifier index and applicable by mobile terminals.

9 Claims, 4 Drawing Sheets

(51) Int. Cl.
*H04W 48/10* (2009.01)
*H04W 48/14* (2009.01)
*H04W 88/02* (2009.01)
*H04W 88/08* (2009.01)

(56) References Cited

U.S. PATENT DOCUMENTS

| | | |
|---|---|---|
| 2010/0027466 A1 | 2/2010 | Mustapha |
| 2015/0304023 A1 | 10/2015 | Cho et al. |
| 2016/0219475 A1* | 7/2016 | Kim ............ H04W 76/27 |
| 2016/0234736 A1* | 8/2016 | Kubota ......... H04W 48/12 |
| 2016/0295374 A1* | 10/2016 | Persson ........ H04W 4/029 |
| 2017/0064691 A1* | 3/2017 | Kubota ......... H04W 48/18 |
| 2019/0215875 A1* | 7/2019 | Kim ............ H04W 74/002 |

OTHER PUBLICATIONS

Samsung, "Contents of Minimum System Information", R2-165200, 3GPP TSG-RAN WG2 Meeting #95, Aug. 22-26, 2016, 4 pages.

European Search Report dated Jan. 25, 2019 issued in counterpart application No. 17803078.9-1214, 13 pages.
PCT/ISA/210 Search Report issued on PCT/KR2017/005416 (pp. 3).
PCT/ISA/237 Written Opinion issued on PCT/KR2017/005416 (pp. 7).
Samsung, 3GPP TSG-RAN WG2 Meeting #94, R2-163371, Nanjing, China, May 23-27, 2016, System Information Signalling Design in NR (pp. 9).
CATT, 3GPP TSG RAN WG2 Meeting #94, R2-163470, Nanjing, China, May 23-27, 2016, System information in NR (pp. 5).
Ericsson, 3GPP TSG-RAN WG2 #94, Tdoc R2-163997, Nanjing, P.R. China, May 23-27, 2016, Solution principles for system information distribution (pp. 6).
HTC, 3GPP TSG-RAN WG2 Meeting #94, R2-163643, Nanjing, China, May 23-27, 2016, Correction on system information handling in eMTC (pp. 8).
CATT, 3GPP TSG-RAN WG2 Meeting #93bis, R2-162568, Dubrovnik, Croatia, Apr. 11-15, 2016, Consideration on higher layer procedures in 5G NR (pp. 3).

* cited by examiner

[Fig. 1]
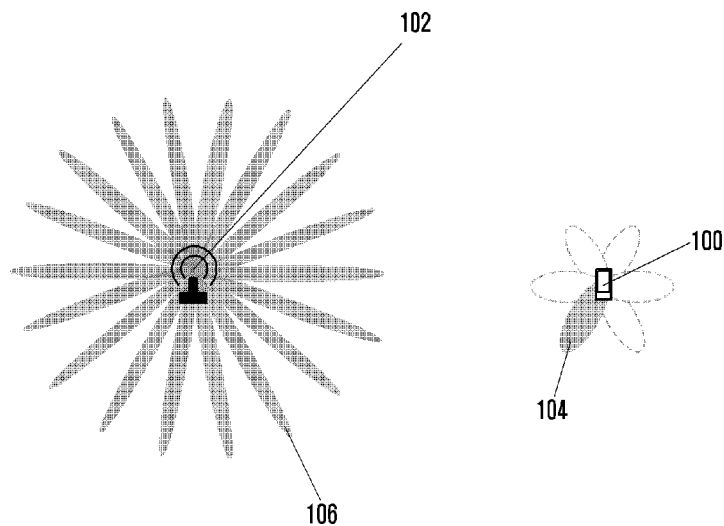
[Fig. 2]
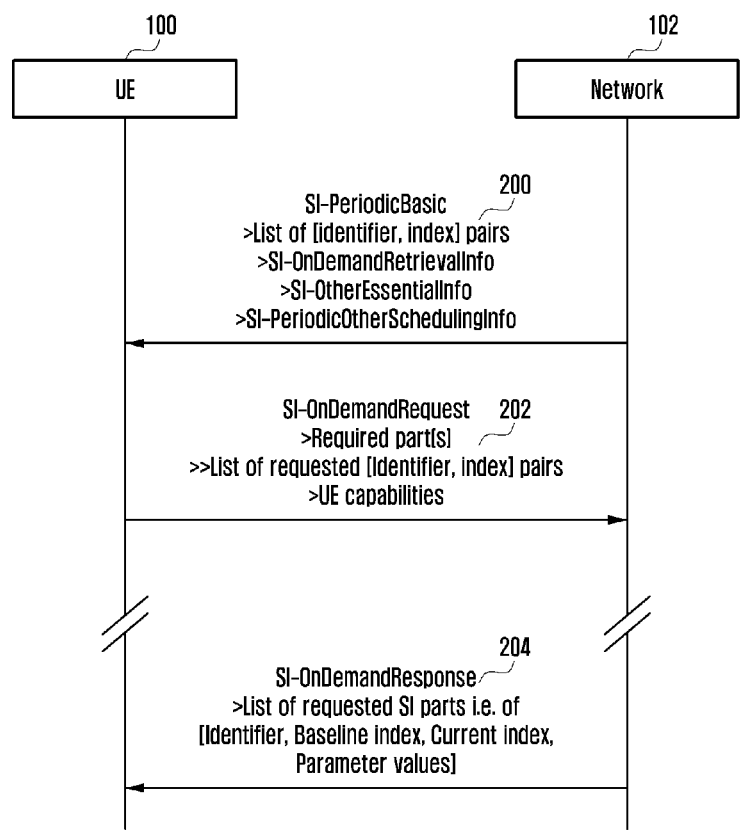

[Fig. 3]
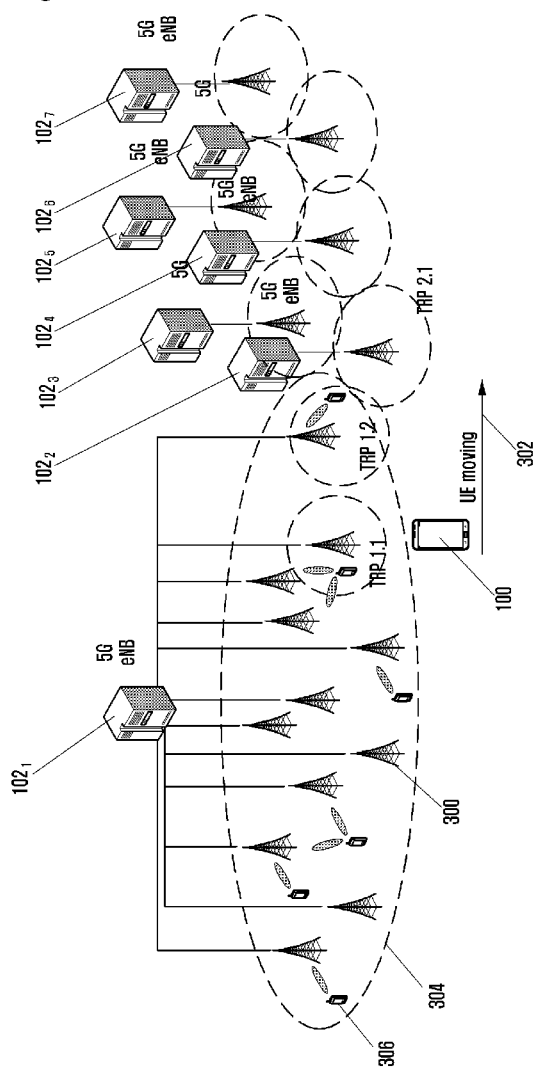

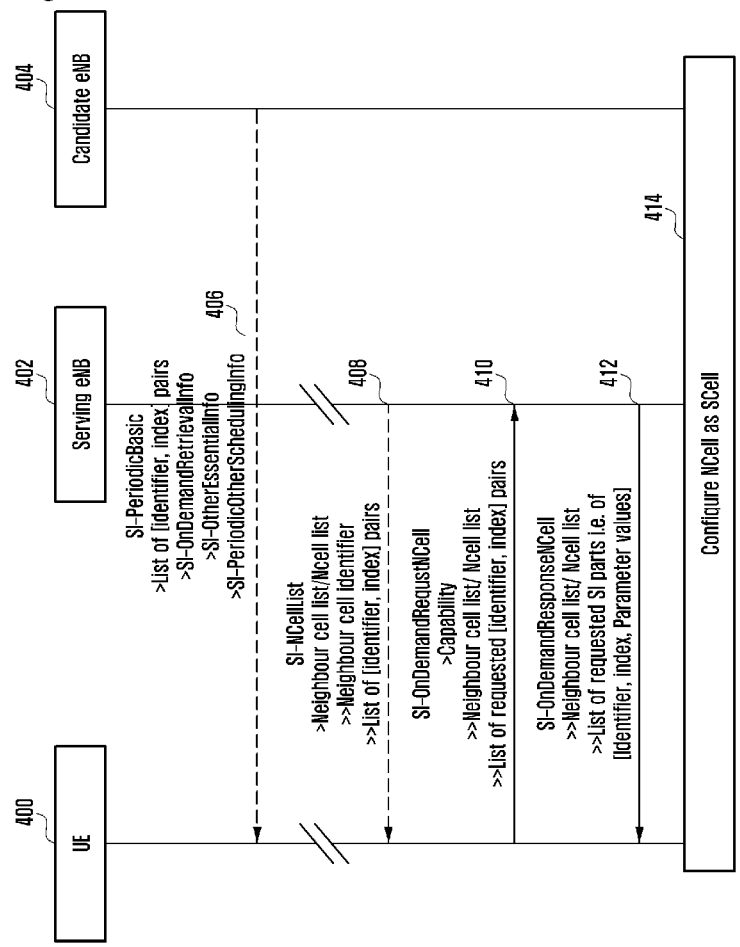
[Fig. 4]
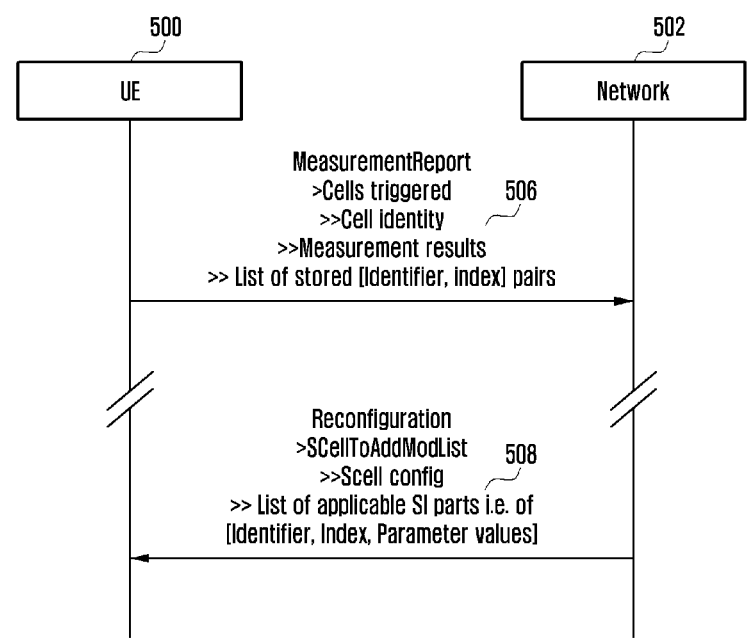
[Fig. 5]

[Fig. 6]
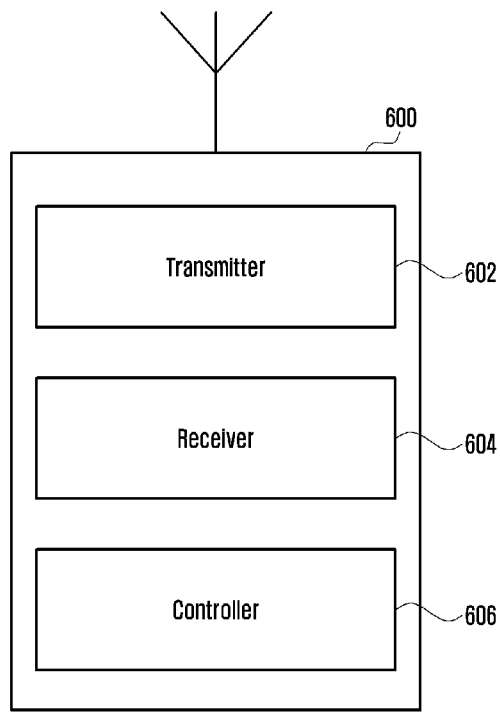
[Fig. 7]
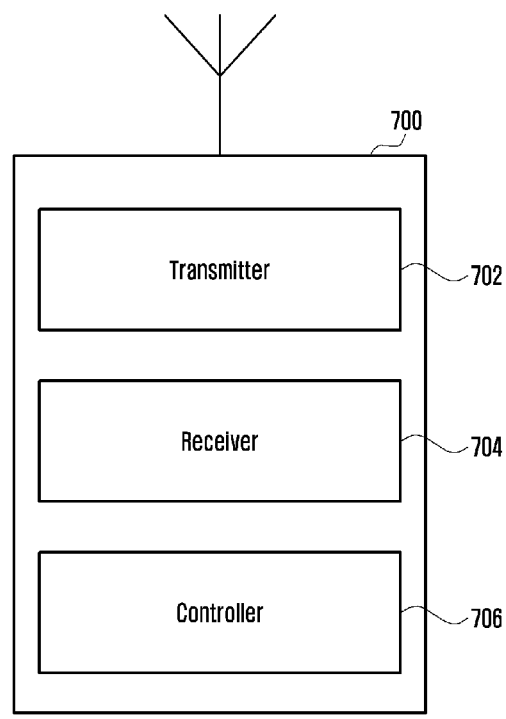

SYSTEM INFORMATION PROVISION

PRIORITY

This application is a National Phase Entry of PCT International Application No. PCT/KR2017/005416 which was filed on May 24, 2017, and claims priority to Indian Patent Application No. 201621017867, which was filed on May 24, 2016, and United Kingdom Patent Application No. 1613389.4, which was filed on Aug. 3, 2016, the content of each of which is incorporated herein by reference.

TECHNICAL FIELD

This invention relates to the provision of System Information (SI) in a wireless communications network. In particular, certain embodiments of the present invention relate to the provision of SI in a standalone wireless communication network in which communication between a mobile terminal and a base station is performed through the use of directional beams, such as has been proposed for Fifth Generation (5G) mobile communication networks. In certain embodiments the network provides values for one or more SI parameter that a mobile terminal is to apply when communicating with the network.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Wireless or mobile (cellular) communications networks in which a mobile terminal (UE, such as a mobile handset) communicates via a radio link with a network of base stations or other wireless access points connected to a telecommunications network, have undergone rapid development through a number of generations. Second Generation (2G) digital systems such as Global System for Mobile communications (GSM) have been largely replaced or augmented by Third Generation (3G) digital systems such as the Universal Mobile Telecommunications System (UMTS), which uses a Universal Terrestrial Radio Access Network (UTRAN) radio access technology and a similar core network to GSM. UMTS is specified in standards produced by the 3rd Generation Partnership Project (3GPP). 3GPP design, specify and standardise technologies for mobile wireless communications networks. Fourth Generation (4G) systems are now widely deployed to provide greater throughput of data. 3GPP standards for 4G systems including an Evolved Packet Core (EPC) and an Enhanced-UTRAN (E-UTRAN) radio access network. The E-UTRAN uses Long Term Evolution (LTE) radio technology, which offers potentially greater capacity and additional features compared with previous standards. LTE is commonly used to refer to the whole system including both the EPC and the E-UTRAN, and LTE is used in this sense in the remainder of this specification, and also should be taken to include LTE enhancements such as LTE Advanced which offers still higher data rates compared to LTE. LTE Advanced is defined by 3GPP standards releases from 3GPP Release 10 and considered to be a 4G mobile communication system by the International Telecommunication Union (ITU).

The trend towards greater data throughput continues with current research to develop Fifth Generation (5G) network technologies. While the form that 5G networks may take is not fully defined, it is probable that 5G networks will include the capacity to provide extremely high data rates to mobile users in relatively compact geographical areas. To meet the continually increasing demand for higher data rates and higher volumes of data transmitted through wireless communication systems, one option is to use a wider frequency band, such as may be available in the Extremely High Frequency (EHF) band (roughly in the 30-300 GHz range). Radio waves in this band range from 10 mm to 1 mm and so the band is sometimes referred to as the millimetre band or millimetre wave (mm-wave). As one example, unlicensed spectrum around 60 GHz may be exploited to provide a high data rate service in a small cell.

Radio waves in the 60 GHz band are subject to high atmospheric attenuation due to absorption by gases in the atmosphere and so are limited in range, though with the benefit of allowing for smaller frequency reuse distances. EHF transmissions are also substantially line of sight and are readily blocked by objects in their path, or reflected or diffracted by building edges. These limitations on EHF transmissions may be mitigated through the use of beam-forming which can increase effective transmission range. Beam-forming may also be exploited at lower frequencies for the purpose of enhanced frequency reuse. Transmission beam-forming concentrates a reach region of a radio wave in a specific direction using a plurality of antennas (an antenna array). Reception beam-forming concentrates the reception of radio waves from an intended direction using a reception antenna array. One way in which beam-forming can be exploited is through the deployment of small cells, (referred to as millimetre wave Small Cells (mmSCs) where utilising mm-wave frequency). Each mmSC communicates with a UE through the use of a directional beam pair in which respective transmission and reception beams are selected to provide for maximum received signal strength based on the known or estimated locations of the UE and the mmSC.

One option that has been proposed for a 5G RAT is to combine a mm-wave network with an overlaid conventional cellular network such as LTE. The UE may have dual RF interfaces for the LTE link and the mm-wave link respectively, referred to as Inter RAT (IRAT) dual connectivity (IRAT aggregation). Such an overlaid conventional cellular network may be used to provide SI. However, it is clear that there is a cost overhead associated with this use of dual RF interfaces. Consequently, standalone mmwave networks, or other standalone networks employing directional beams, have been proposed for the 5G RAT. Embodiments of the present invention encompass, but are not limited to, such standalone networks.

SI comprises a wide range of parameters provided by the network to mobile terminals. SI includes information which is required by the mobile terminals for the effective functioning of the network. SI may be considered to be a set of parameters, where each parameter may be accorded a value to be applied by a mobile terminal when communicating with a network. The mobile terminal (and the network) may store the SI parameter values, or indeed more than one value for certain parameters. While the full details of SI for 5G networks are not yet finalised, based on what is currently used in LTE, 5G SI may include:

Information required by UEs in idle mode, for instance:
to initially select a suitable cell or to subsequently re-select a better cell, including intra-frequency, inter-frequency, inter-RAT (Radio Access Technology);
parameters related to receiving paging;
information related to performing initial access including access barring and parameters about how to establish a connection (through a Random Access Channel, RACH);
information about services available in idle mode, for instance, Multimedia Broadcast/Multicast Service (MBMS), sidelink discovery or communication;
information about functionality supported in the cell system time; or
public warning messages.

Information only used in connected mode, for instance:

cell specific parameters including regarding channels only used in connected mode, including Physical Downlink Shared Channel (PDSCH) or Physical Uplink Shared Channel (PUSCH);
power control information; or
information about services only available in connected, for instance Single-cell Point-to-Multipoint (SC-PTM).

System information parameters are typically transmitted in separate groups, often referred to as a Master Information Block (MIB) and System Information Blocks (SIBs). Typically, there is only a single MIB and two or more SIBs. The MIB and the SIBs may be differentiated according to their transmission periodicity. Grouping of parameters may therefore typically be based on their scheduling requirements but also according to purpose. Again, as the full details of 5G SI are not finalised, the grouping of SI parameters into MIBs and SIBs is also not finalised. However, it is assumed that the grouping may follow a similar pattern to that of related RATs such as for UMTS. 3GPP TS 25.331 (version 13.2.0 of 31 Mar. 2016 available at http://www.3gpp.org/DynaReport/25331.htm) includes table 8.1.1 providing a specification of SIB characteristics. This table includes an "area scope column" in table 8.1.1 specifying the area in which a system information block's value tag is valid, which is generally for a single cell.

Especially at higher frequencies, as discussed, above 5G is assumed to employ beam-forming based transmission with full coverage provided by a multiple number of beams transmitted in turn (beam-sweeping). It has been identified that in a beam-formed system, system information transmission using current approaches for LTE leads to significant system overhead. Furthermore, in non-beam-formed 5G systems, it has been identified that SI transmission using periodic broadcast may not be optimal in certain scenarios, for instance if no UE in a cell is interested in a specific service or if most UEs are stationary and no new UEs have entered the cell since the SI was last broadcast.

DISCLOSURE OF INVENTION

Technical Problem

In order to limit signalling overhead and energy consumption where there is no overlaid cellular network, such an LTE network, it has been suggested to only broadcast the most essential system information while the remainder may be provided on-demand to a specific UE or group of UEs. Under such a scenario, only the most essential information is broadcast, with the onus being passed to the UEs to request further SI as required. For a standalone mode 5G RAT it is clear that SI required for initial access needs to be broadcast, as is the case currently for LTE, with the remainder provided on-demand. It is further necessary that sufficient SI is broadcast to enable further SI to be requested as required by the UE. The on-demand transfer of SI may also be broadcast by the base station (which may be referred to as a 5G enhanced Node B, eNB) or provided by dedicated signalling to the UE (the latter implying that all information needed to establish such a dedicated connection has been broadcast). For a non-standalone mode 5G RAT, the majority of SI could be provided through dedicated signalling through the 4G Primary Cell (PCell). However, it may be undesirable to adopt different approaches for standalone and non-standalone modes of 5G RAT.

On-demand provision of SI may be performed following a normal dedicated signalling approach: the UE enters connected mode, sends a request for SI to the network, the network responds with the requested SI (that is, the request SI parameter values that are to be applied by the UE) by dedicated signalling. Alternatively, the request might be sent as part of and/or following random access without entering connected mode, in which case the network response would not be dedicated. In a further alternative, irrespective of whether SI is requested as part of random access or through dedicated signalling, a response may be common to a group of UEs or broadcast and so also available to other UEs. The base station might delay responding with requested SI to collect requests from multiple UEs.

It has further been suggested that in place of the base station transmitting a large number of parameter values, these may be represented by an identifier, with only the identifier being broadcast or transmitted to the UE by dedicated signalling. As such, a single identifier would indicate the value of a large number of parameters. It is assumed that the UE is equipped with sufficient information to understand the group of parameters that each identifier represents. If the UE does not recognise the identifier, it would request the eNB to provide the value of each individual parameter covered by the identifier (again in an on-demand fashion). This concept may be considered to comprise the identifier pointing to a table entry, such as may be stored at the UE and at the base station. This may be referred to as a System Information Table in which each index identifies a different set of SI parameters associated with the identifier.

It is considered that the identifier would not be cell specific, rather it could be unique within an entire Public Land Mobile Network (PLMN). As such, when the UE moves to another cell employing the same identifier, the UE need not request the concerned parameters again. However, this differs from current LTE based mobile systems in which SI is cell specific meaning that if the UE changes to another cell it has to acquire all necessary SI. An exception to this is if the UE has recently visited a cell (for instance within the last 3 or 24 hours), in which case the UE may store the SI for that cell. This is enabled through the use of a value tag, with the UE comparing the value tag for stored information to the value tag currently broadcast within the cell. During this time, if the UE sees the same value tag, it can assume the SI is still the same. If the UE visited longer ago, the UE must assume the SI is different even if the value tag is the same. The value tag may just a few bits, and network may have done so many changes that the value tag may have wrapped around. It will be appreciated that it would be an undue burden for the UE to store cell specific SI for longer periods of time, and in any event the probability of cell specific SI remaining unchanged decreases over time. Furthermore, there is no purpose in storing cell specific SI for longer periods of time if it cannot be assumed that the value tag relates to the same SI (due to the network reuse of value tags noted above).

There may be a common value tag for a cell and SIB specific value tags. The common value tag changes only when at least one of the SIB specific value tags changes. From the UE perspective, when the UE notes that a common value tag has changed, it need only look to see which one or more of the SIB specific value tags has changed and then acquire only that updated SIB. As such, the value tag indicates only whether values are different from the ones previously broadcast in the cell, and do not directly relate to or represent SIB information, in particular due to value tag reuse. It is emphasised that the use of value tags in current systems differ from form of SI index proposed for future 5G systems as it merely indicates the validity of SI within the scope of a specific cell.

While the use of on-demand provision of SI, and the use of identifiers, reduces the volume of periodically broadcast SI, it is considered that for future 5G systems the volume of information transmitted on-demand may result in excessive signalling.

Solution to Problem

It is an aim of certain embodiments of the present invention to address at least some of the problems discussed above associated with the provision of SI. In particular, certain embodiments of the present invention provide an alternative approach to the provision of SI suited to a standalone 5G wireless communication network. Further embodiments of the invention are suited to IRAT aggregation in which a 5G network operating through directional beams is aggregated with a cellular network. The invention is not limited to any specific RAT. Certain embodiments of the invention result in a reduction in the SI signalling overhead in such a network. Specific, it is an aim of certain embodiments of the invention to minimise the volume of SI that is periodically broadcast.

According to a first aspect of the present invention there is provided a method by a base station in a wireless communication network, the method comprising: receiving, from a terminal, a message including at least one of an identifier and an index, the identifier being associated with system information (SI) parameters and the index being associated with SI parameter values; and transmitting, to the terminal, a response message including SI parameter values indicated by the index for SI parameters corresponding to the identifier.

Preferably, prior to receiving the message, further comprising: transmitting, to the terminal, a first message including a list of an identifier associated with SI parameters and an index associated with the SI parameter values.

Preferably, further comprising: determining SI parameter values to be transmitted to the terminal, based on the list of the identifier and the index transmitted to the terminal and the identifier and the index received from the terminal.

Preferably, wherein the identifier corresponds to each of groups of SI parameters partitioned from SI, and wherein the SI is partitioned into the groups of SI parameters based on at least one of a frequency of changing SI parameters, a trigger condition of changing SI parameters and an area scope within which the SI parameter is valid.

According to a second aspect of the present invention there is provided a base station in a wireless communication network, the base station comprising: a transceiver configured to transmit and receive a signal; and a controller configured to control the transceiver to receive a message from a terminal, the message including at least one of an identifier and an index, the identifier being associated with system information (SI) parameters and the index being associated with SI parameter values; and to transmit a response message including SI parameter values indicated by the index for SI parameters corresponding to the identifier to the terminal.

Preferably, wherein the transceiver is further configured to transmit a first message including a list of an identifier associated with SI parameters and an index associated with the SI parameter values to the terminal, prior to receiving the message.

Preferably, wherein the controller is further configured to determine SI parameter values to be transmitted to the terminal, based on the list of the identifier and the index transmitted to the terminal and the identifier and the index received from the terminal.

Preferably, wherein the identifier corresponds to each of groups of SI parameters partitioned from SI, and wherein the SI is partitioned into the groups of SI parameters based on at least one of a frequency of changing SI parameters, a trigger condition of changing SI parameters and an area scope within which the SI parameter is valid.

According to a third aspect of the present invention there is provided a method by a terminal in a wireless communication network, the method comprising: transmitting, to a base station, a message including at least one of an identifier and an index, the identifier being associated with system information (SI) parameters and the index being associated with SI parameter values; and receiving, from the base station, a response message including SI parameter values indicated by the index for SI parameters corresponding to the identifier.

Preferably, prior to transmitting the message, further comprising: receiving, from the base station, a first message including a list of an identifier associated with SI parameters and an index associated with the SI parameter values.

Preferably, wherein the SI parameter values to be received from the base station is determined by the base station based on the list of the identifier and the index transmitted to the terminal and the identifier and the index received from the terminal.

Preferably, wherein the identifier is corresponding to each of groups of SI parameters partitioned into SI, the groups of SI parameters are partitioned based on at least one of factors comprising a frequency of changing SI parameters, a trigger condition of changing SI parameters and an area scope within which the SI parameter is valid.

According to a fourth aspect of the present invention there is provided a terminal in a wireless communication network, the terminal comprising: a transceiver configured to transmit and receive a signal; and a controller configured to control the transceiver to transmit a message to a base station, the message including at least one of an identifier and an index, the identifier being associated with system information (SI) parameters and the index being associated with SI parameter values; and to receive a response message including SI parameter values indicated by the index for SI parameters corresponding to the identifier from the base station.

Preferably, wherein the transceiver is further configured to receive a first message including a list of an identifier associated with SI parameters and an index associated with the SI parameter values from the base station, prior to transmitting the message.

Preferably, wherein the SI parameter values to be received from the base station is determined by the base station based on the list of the identifier and the index transmitted to the terminal and the identifier and the index received from the terminal, wherein the identifier is corresponding to each of groups of SI parameters partitioned from the SI, and wherein the SI is partitioned into the groups of SI parameters based on at least one of a frequency of changing SI parameters, a trigger condition of changing SI parameters and an area scope within which the SI parameter is valid.

Advantageous Effects of Invention

It is an aim of certain embodiments of the present invention to address at least some of the problems discussed above associated with the provision of SI. In particular, certain embodiments of the present invention provide an alternative approach to the provision of SI suited to a standalone 5G wireless communication network. Further embodiments of the invention are suited to IRAT aggregation in which a 5G network operating through directional beams is aggregated with a cellular network. The invention is not limited to any specific RAT. Certain embodiments of the invention result in a reduction in the SI signalling overhead in such a network. Specific, it is an aim of certain embodiments of the invention to minimise the volume of SI that is periodically broadcast.

BRIEF DESCRIPTION OF DRAWINGS

Embodiments of the invention are further described hereinafter with reference to the accompanying drawings, in which:

FIG. 1 illustrates a UE communicating with a 5G base station;

FIG. 2 illustrates on-demand provision of SI according to an embodiment of the present invention;

FIG. 3 illustrates an example of a UE moving between Transmission Reference Points in accordance with an embodiment of the present invention;

FIG. 4 illustrates on-demand provision of SI according to an embodiment of the present invention in the event of IRAT aggregation;

FIG. 5 illustrates an alternative for the on-demand provision of SI according to an embodiment of the present invention in the event of IRAT aggregation;

FIG. 6 illustrates the structure of a 5G base station in accordance with an embodiment of the present invention; and FIG. 7 illustrates the structure of a UE in accordance with an embodiment of the present invention.

MODE FOR THE INVENTION

Embodiments of the present invention will now be described in the context of a standalone 5G wireless communications network. It will be understood that the present invention is not limited to any particular radio access technology, though encompasses the use of mm-wave directional beams, including standalone networks without an overlaid cellular network. Specifically, embodiments of the present invention relating to the provision of SI on-demand are applicable to both standalone networks and IRAT aggregation/dual connectivity. The term "base station" may be used to refer to any network component, such as an mmSC or any other form, capable of communicating with a UE. However, because the use of directional beams is expected to form a key component of 5G networks, this will now be briefly described.

Referring to FIG. 1, this shows a single UE 100 and a single mmSC 102 in a standalone mm-wave network. An initial access procedure comprises the UE transmitting a random access (RA) preamble through beams 104 and the mmSC receives the RA preamble through beams 106. For the present purposes the UE 100 will be considered to transmit through only a single beam 104 at a time and the mmSC 102 will be considered to only receive signals through a single beam 106 at a time during an initial access procedure, but following this multiple beams on both sides may be used. In addition, as discussed further below, the UE may communicate with multiple Transmission Reference Points (TRPs) within a 5G cell operated by a base station. As such, only a single UE transmission beam is shown, comprising the currently operated transmission beam, which may be examined by the mmSC, and the remaining transmission beams are shown dashed. It will be appreciated that there may be more or fewer transmission beams.

The present inventors have recognised that SI identifiers are particularly suited to a situation in which only a subset of UEs require access to information, for instance service specific information, MBMS being an example. An SI identifier is less suitable when the SI is dynamically changing, the SI is only required after connection establishment (in which case it may suitably be provided by dedicated signalling), information is quickly required by all UEs (for instance, a public warning message) or information for initial access (for instance, a PLMN identity).

Furthermore, the present inventors have identified that there may be differences in the validity of SI parameter values across a network, between cells and within a single cell. Some SI parameter values may be valid in a set of TRPs within a single cell, but not valid for other TRPs. Some SI parameter values may be valid throughout a cell. Some SI parameter values may be valid within a group of cells (for instance, within a radio/paging area). Some SI parameter values may be valid across an entire network. As an example, some SI parameter values may concern functionality only supported by a subset of involved hardware entities, whereas other SI parameters may depend on the particular characteristics of the hardware. A further factor affecting the validity of SI parameter values is how dynamic the parameters are. For instance, access control should be off for most of the time, but in the case of congestion access control parameters may be regularly turned on. In contrast, paging or SI broadcast related configuration parameters remain unchanged for long periods of time.

As a result of these observations, the present inventors have proposed that in certain embodiments of the present invention multiple identifiers may be used. Each identifier represents or corresponds to a different SI part. That is, each identifier indicates an SI part—a particular set of parameters or groups of SI parameters, for instance a group of SIBs. It may be that there is no overlap between the SI parts such that each SI parameter is assigned to a group represented by a single identifier. However, the present invention does not exclude the option of some SI parameters being included in multiple SI parts such that there is overlap. The partitioning of the SI parameters (or SIBs) and their assignment to different identifiers may be performed based on a range of factors in accordance with certain embodiments of the present invention. One factor may be the frequency within which the SI parameter changes. Another factor may be the area scope within which the SI parameter is valid: a single TRP, multiple TRPs, a whole cell, a group of cells forming a Radio Area or wider. A further factor may be how the SI parameter changes—the trigger for that change. It will be appreciated that there may be many other factors taken into account in grouping SI parameters and the above listed factors are only examples that may or may not be taken into account in any particular embodiment, either individually or in combination with other factors.

For each identifier, an index directly indicates a particular set of values for the SI parameters represented by the identifier. That is, while the identifier serves to identify a particular set of SI parameters, but the value of the index directly indicates the values of those SI parameters (a particular set of values for the SI parameters). The index may be included within or associated with the identifier. The identifier and an index may be transmitted as a pair. The identifier and multiple indices indicating different sets of SI parameter values for the same SI parameters may be transmitted as a group. In some cases it may only be the index that is transmitted between the mobile terminal and the base station, the recipient being able to determine which identifier is relevant, for instance by the position of the index within a message. That is, embodiments of the present invention encompass not explicitly signalling the identifier, only the index, in messages. Alternatively, where the index is included within the identifier, for instance as a suffix or a portion of the information, it may be considered that only the identifier is required, the identifier including one or more values or indices indicating the respective sets of SI parameter information. Upon receipt of an identifier together with an index (or the index on its own) a network element, including a UE, is able to ascertain whether the value of the index is known to correspond to a set of locally stored or available SI parameter values associated with the identifier (that is, for the set of parameters represented by the identifier). While the present invention is described primarily in terms of identifiers with associated index values, according to certain embodiments there may only be a single piece of information representing both the set of SI parameters and a particular set of values for those parameters (which may be termed an identifier or an index, or given a separate term).

The present inventors have also proposed that in certain embodiments of the present invention the network may only provide SI parameter values for those parts of the SI associated with or represented by a particular identifier that the UE does not currently hold (or for which the UE does not currently hold a valid version). This may be referred to as delta signalling. The UE may request SI associated with an identifier without indicating any index value. However, the UE, upon requesting SI, may indicate one or more indices for an identifier. That identifier may represent the whole of the SI or a particular portion of the SI in the event of multiple identifiers as described in the previous paragraph. In a single request the UE may reference one or more identifiers with or without an index for each identifier. Where an index is provided by the UE it indicates a set of SI parameter values held by or available to the UE. The UE may thus provide an index if the index transmitted by the network for that identifier does not match the locally stored index. Furthermore, the UE may store multiple indices for a single identifier, together with corresponding sets of SI parameter values. Upon requesting SI on-demand, the UE may provide two or more indices indicating two or more baseline sets of SI parameter values that the base station may use as the starting point for delta signalling (if the base station itself stores or has available those identifier values and associated sets of SI parameter values).

The base station stores an index indicating a set of parameter values to be applied by the UE either in respect of communicating with that base station or in respect of communicating with a neighbouring base station in the case of IRAT aggregation, as described below in connection with FIGS. 4 and 5. The base station may then determine what portion of the parameter values associated with SI indicated by that index needs to be provided (or whether the whole SI associated with that identifier should be provided) as appropriate. This determination is based on a comparison of the SI parameter values indicated by the index (or one of the indices) received from the UE and the index held by the base station for parameter values to be applied by the UE. In the event that the or each received index is not recognised by the base station, the whole content of the SI associated with that identifier may be transmitted to the UE.

According to certain embodiments, the identifiers used may be valid throughout the whole PLMN. Accordingly the length of an index is chosen such that the value range suffices to cover all possible configurations of SI parameters represented by the identifier to allow different configurations to be comprehensively indicated. Each index may be assumed to be valid for a predetermined period of time to allow index reuse. Similarly, storage of an index and the associated SI parameter values by a UE (at least other than for the currently used SI parameter values) may only be for a further predetermined period of time to minimise the UE storage requirements. For instance, a UE may discard a portion of SI if it does not observe the associated index being used for 3 days.

In accordance with certain embodiments, to reduce the signalling overhead further the network may combined multiple requests for on-demand SI from multiple UEs (collected during a predetermined window). The base station may then provide a combined response. This may be efficiently performed by broadcasting commonly requested SI parameter values, or portions of SI parameter values, and then providing UE specific parts by dedicated signalling. Alternatively, at least some of the commonly requested parts may be provided by dedicated signalling to multiple UEs and at least some of the UE specific parts may also be broadcast.

In accordance with certain embodiments, it may be possible to employ a Single Frequency Network (SFN) transmission for broadcast SI on-demand. This requires that information transmitted by TRPs participating in the SFN transmission are covered by exactly the same SI. SI information that it not the same, for instance TRP specific SI covered by a separate SI identifier, is transmitted separately (that is, through a non-SFN).

Referring now to FIG. 2 this illustrates on-demand provision of SI according to an embodiment of the present invention. FIG. 2 illustrates an embodiment of the present invention for standalone 5G network. Messages exchanged between a UE 100 (that is, a mobile terminal) and the network 102 (that is, a base station in radio communication with the UE) are identified. It will be understood that the labels ascribed to the messages and their components, described below, are not limiting.

Message 200 comprises the periodic broadcast of basic SI information (SI-PeriodicBasic). This may include basic SI information—the actual SI parameter value—which are required by UEs to communicate with the network. This basic SI information may include, but is not limited to, SI-OnDemandRetrievalInfo, comprising SI required by a UE to communicate with the network to demand further SI, SI-OtherEssentialInfo, comprising other essential SI required by UEs, and SI-PeriodicOtherSchedulingInfo, comprising scheduling information of other SI that is periodically broadcast. Although only a single periodic broadcast message is shown at message 200, it will be understood that there may be multiple such periodic messages with different SI included in each, and the periodicity of each message may vary.

Message 200 further includes a list of one or more identifier and index pairs. Alternatively, message 200 may include only the indices themselves, as described above. The or each index included in message 200 identifies a set of SI parameter values for the associated identifier. The index for each identifier indicates a set of SI parameter values that the UE should apply. That is, according to certain embodiments, the set off SI parameter values indicated by each index are those that the UE should apply when communicating with that base station.

From the transmitted index for each identifier the UE is able to determine whether that index is known to the UE, and whether it indicates a set of SI parameter values for the SI part represented by the identifier which is available to the UE (typically, locally stored by the UE). In the event that only the index is included in message 200, the associated identifier may be identified to the UE for instance either by further identifying information along with the index, or by the position of the index in message 200. If the value of an index received in message 200 is known to the UE, then this indicates that the parameter value or values associated with that index and stored at the UE remain valid and there is no requirement to request those parameters afresh. If an index in message 200 for a particular identifier differs from that stored by the UE (with the associated set of SI parameter values), this indicates that at least one SI parameter value associated with the identifier has changed. As noted above, the UE for each identifier may store multiple indices and associated sets of SI parameter values for a single identifier, such that a new index for an identifier being received from the network (relative to the index for the set of SI parameter values currently applied by the UE) may require only that the UE switches to applying a different locally stored set of SI parameter values for that identifier. In other cases, the UE may optionally request updated SI parameter values from the network for the parameters associated with that identifier. However, if the UE is aware that the SI associated with that identifier concerns services that are not currently required by the UE then the request for SI may be postponed until such time as it is required, or not sent at all.

Message 202 comprises a request from the UE for updated SI parameter values when an index for an identifier received in message 200 is not recognised (SI-OnDemandRequest). Message 202 indicates the required part or parts of the SI parameter values. The required parts may comprise a list of identifier, index pairs, where if the UE has a locally stored index and set of parameter values for one or more identifier. If there is no such locally stored index for an identifier then only the identifier may be included in the message. As an example, if it is assumed the SI has three parts for which separate identifiers are used, if in such a case the UE requests on-demand provision of parts 1 and 3, it will indicate the identifiers of those two parts. In certain embodiments, for each identifier where updated SI parameter values are provided the UE may include in message 202 one or more indices indicating sets of SI parameter values locally available to the UE. The network can then see that, for instance, the UE has a part 1 configuration that is the same except for one SI parameter value. In that case, the network only provides that one parameter value instead of the entire part 1 set of SI parameter values (that is, through the use of delta signalling). Accordingly, through the use of delta signalling, only changed portions of the SI parameter values associated with the identifier (relative to a UE stored set of parameter values) need be returned to the UE by comparison at the network of a parameter set indicated by the index transmitted in message 200 and the parameter set indicated by an index received in message 202. It will be appreciated that delta signalling may not be performed for all identifiers where the corresponding SI parameter values are demanded. As one example, the UE may store SI parameter values (with an index) for one identifier and for which a portion of the parameter values may remain valid, whereas for another identifier there may be no locally stored SI parameter values (or index). The UE may also provide capability information in message 202, thereby enabling the network to miss out SI parameter values not relevant to the UE when returning demanded SI.

Upon receipt of message 202 the network may return the requested SI parameter value information in response message 204 (SI-OnDemandResponse). As discussed above, message 204 may be provided by dedicated signalling to a single UE or a group of UEs, or it may be broadcast. Alternatively, there may be two or more messages 204 (not shown in FIG. 2) in the event that a portion of the demanded SI is broadcast (on the grounds that it is required by multiple UEs) and at least one further portion is provided by dedicated signalling to one or more UEs. Furthermore, SI associated with more than one identifier that has been requested may be included, or may be split across multiple such messages. Where the UE has provided an index for an identifier in message 202, the demanded SI parameter values may be provided by delta signalling in which only changed portions of the SI associated with that identifier are provided. The extent to which the network employs delta signalling is up to network implementation. For example, the network may not immediately respond to an on-demand request of one particular UE, but wait to see if more UEs require the concerned SI part. If this is the case, the network may choose to provide a combined response taking into account the information required by each UE that requested the information. In such cases the network in the response may omit parameter values for which none of the requesting UEs requires an updated value. The SI information provided by the network comprises content—the actual SI parameter values. In the event of delta signally, the corresponding index may be included to indicate to the UE which set of SI parameter values held by the UE has been used as the baseline for delta signalling. This inclusion of the index used as the baseline may be required when the UE has indicated indices for a single identifier in message 202, and optional when only a single identifier value is provided by the UE. Message 204 may further include the index for the set of SI parameter values for that identifier that is included in message 204 (or partially included in the case of delta signalling). Normally, that index would be the same as that indicated in message 200, but in case the network is just changing the configuration of the concerned part of the SI at the same time, it may be different. In the latter case the new index may be included in message 204. Alternatively, the UE may read the new value from the next transmission of message 200. Message 204 is shown for the situation in which delta signalling is employed and so includes a list of requested parts comprising, for at least one identifier, the identifier, that baseline index, the current index and the parameter values required to be transmitted. It will be appreciated that where message 204 relates to multiple identifiers the information included may differ according to the above described options in respect of each identifier.

Upon receipt of message 204 the UE identifies the SI and stores the parameter values along with the appropriate index. The SI parameter values indicated by the index may then be applied by the UE. Particularly in the event that the whole or a portion of the demanded SI is provided by a broadcast message, it may be that message 204 includes SI parameter values relating to services not required by the UE and so not all of the SI needs to be stored.

Referring to FIG. 3, this shows an exemplary network architecture comprising a plurality of base stations 102 and a first UE 100. Clearly there may be many UEs present as indicated at points 306 (only one of which is labelled). Each base station 102 (labelled as a 5G eNB—enhanced Node B) is associated with at least one TRP 300 (only one being labelled). A first 5G eNB 1021 is associated with a plurality of TRPs 300. In FIG. 3 the UE 100 is moving as indicated by arrow 302 causing the UE 100 to move between the coverage area of TRPs 300. Two movement scenarios are considered. Firstly, the UE 100 may move from the coverage of TRP1.1 to TRP1.2, both part of a same cell 304 connected to same 5G eNB 1021. Secondly, the UE 100 may move from the coverage of TRP1.2 to TRP2.1, also changing from cell 1 to cell 2 (TRP2.1 being connected to a different 5G eNB 1022).

Table 1 shows three different parts of the SI—A, B and C (different identifiers). The index associated with each SI part (identifier) in each identified TRP is shown. That is, for each TRP there is an index for each identifier indicating the relevant set of SI parameter values that is to be applied by a UE communicating with the TRP. It is clear that SI part B is fixed for a wider geographic area than SI in part A (which is limited to a single TRP, whereas SI part B is applicable throughout the cell associated with 5G eNB 1021). SI part C is applicable throughout a paging area, encompassing at least the cells associated with 5G eNBs 1021 and 1022.

TABLE 1

| SI part (identifier) | Concerns | TRP1.1 | TRP1.2 | TRP2.1 |
|---|---|---|---|---|
| A | TRP specific information | 10 | 12 | 304 |
| B | Cell specific information | 198 | 198 | 211 |
| C | Paging area specific information | 117 | 117 | 117 |

When the UE moves from the coverage of TRP1.1 to TRP1.2, it may only need to request on-demand provision of SI part A (as for B and C the index did not change). When the UE from the coverage of TRP1.2 to TRP2.1, it may only need to request on-demand provision of SI part A and B (as for C the index did not change). In each case, the UE may indicate to the base station the value of the identifier held by the UE so that the base station may apply delta signalling.

Table 2 shows SI part A of Table 1 in greater detail, split out into four parameters with all four being optional. As noted above, the UE may store or otherwise have available to it SI parameter values associated with an identifier, for instance A. In certain embodiments for parts of SI information the UE may hold more than one index an associated sets of SI parameter information. Table 2 shows that the UE has two stored indices for SI part A: 6 and 300. The corresponding values for each part of A are also shown. Similarly, the corresponding parameter information stored or available to each of TRP1.1, TRP1.2 and TRP2.1 are shown together with the corresponding indices. The UE may indicate either or both stored indices when requesting on-demand SI information relating to identifier and SI part A.

TABLE 2

| SI-Part (identifier) | Concerns | Index 6 stored by UE | Index 300 stored by UE | Index 10 at TRP1.1 | Index 12 at TRP1.2 | Index 304 at TRP2.1 |
|---|---|---|---|---|---|---|
| A.1 | Parameter 1, optional | — | 2 | — | 1 | 3 |
| A.2 | Parameter 2, optional, list of 1 to 16 | 2, 4, 6 | 1, 2, 3, 7 | 2, 4, 6 | 2, 4, 6 | 1, 2, 3, 7 |
| A.3 | Parameter 3, optional | Type 2 | Type 3 | Type 1 | Type 2 | Type 3 |
| A.4 | Parameter 4, optional | A | A | A | A | A |

When the UE attaches to TRP1.1, the network may use the index 6 as baseline, and only provide SI parameter value A.3 (as A.1, A.2 and A.4 are unchanged). The UE may now store this configuration (identifier value A=12)

When the UE moves from the coverage of TRP1.1 to TRP1.2, the network only needs to provide SI parameter value A.3 (as A.1, A.2 and A.4 are unchanged compared to the value of identifier A=10).

When the UE from the coverage of TRP1.2 to TRP2.1, the network needs to provide

SI parameter value A.1, A.2 and A.3 (as only A.4 is unchanged).

In case the network provides a single on-demand provision message in response to requests from multiple UEs, it can omit the parameter values not required by any of the requesting UEs.

Embodiments of the present invention described above concern the on-demand provision of SI in a standalone 5G network. As previously noted, an alternative network architecture is to overlay a cellular network, for instance an LTE network, for the effective provision of information, including SI. This may be termed Inter RAT aggregation (IRAT aggregation). Two alternative embodiments for IRAT aggregation and the on-demand supply of SI will now be described in connection with FIGS. 4 and 5. This may be broadly considered to be analogous to the above described processes for standalone networks and so only the differences are noted.

In IRAT aggregation the UE is served by a Primary Cell (PCell) and a Secondary Cell (SCell). The PCell may comprise a macro cell with omnidirectional or sectored transmissions to UEs, each operating an omnidirectional antenna. The SCell may operate through directional beams from one or more TRPs. It will be appreciated that SI needs to be available upon SCell configuration. As such, the on-demand provision of SI must have been initiated beforehand. For a candidate SCell the UE first needs to know the candidate cell's SI identifiers indices. This may be acquired by the UE either from the candidate cell or from the PCell (also referred to as the Serving Cell). The PCell might provide this to the UE on-demand (to reduce the volume of broadcast information). Next, the UE may send an on-demand SI request according to the values of the received indices and whether they are recognised. This request for on-demand SI is broadly the same as described for message 202 of FIG. 2, the key difference being that now the SI is requested in respect of one or more neighbouring cells (NCells)—that is candidates to form an SCell.

This on-demand supply of SI information for NCells must be triggered by the UE prior to SCell configuration, either by a specific request message (described below in connection with FIG. 4) for by the insertion of such a request message into a measurement report (described below in connection with FIG. 5). This may be achieved by the insertion of a flag into a measurement reporting configuration previously provided by the network to the UE. Such a flag indicates that if the UE triggers measurement for a particular NCell, it should acquire certain relevant SI parts of the concerned cell.

For both described IRAT aggregation cases, a UE triggers a measurement report when one or more neighbouring cells triggers a measurement reporting event condition. It is assumed that for this particular event condition, a flag is provided to inform the UE that it has to acquire the SI applicable when the concerned cell is configured for IRAT aggregation. From this the UE knows for which neighbouring cells it has to request on demand SI provision. Prior to the message flow diagrams for FIGS. 4 and 5 for either embodiment, there may be a reconfiguration message providing this flag information transmitted from the network to the UE. The reconfiguration message may include, as conventional, a measurement configuration including a reporting configuration, in turn defining an event condition. According to certain embodiments of the invention the reconfiguration message may further define the flag to indicate that according to the event condition SI is to be acquired.

Referring first to FIG. 4, this illustrates a first example of on-demand provision of SI in the event of IRAT aggregation. FIG. 4 shows a UE 400 currently served by a PCell 402 (labelled a Serving eNB). The network includes a candidate eNB (an NCell) 404 for which the UE must acquire SI from the PCell 402 prior to configuring a SCell to communicate with the candidate eNB.

According to certain embodiments illustrated by FIG. 4, the UE first obtains identifier indices for the candidate eNB 404. This may either be directly from the candidate eNB 404 through SI-PeriodicBasic message 406 or separately through SI-NCellList message 408 received from the serving eNB 402. More generally, it may be stated that the UE receives the indices for the NCell somehow. Message 406 may be generally the same as message 200 of FIG. 2 and so will not be further described. Message 408 in contrast includes a list of Neighbouring Cells (NCells), also referred to as an NCell list, comprising or accompanied by identifiers for each NCell. For each NCell there is provided a list of identifiers and their associated indices, or optionally just the indices as discussed above in connection with FIG. 2.

In response, the UE 400 transmits a request message SI-OnDemandRequestNCell 410. In large part this is the same as for message 202 of FIG. 2 and so will not be further described. One difference is the provision of a Neighbour cell list/NCell list indicating the NCells associated with the identifiers for which SI parameter values are requested (in the event that message 406 is received not message 408, the NCell list may include only the particular candidate eNB 404 NCell). Identifiers are only requested in respect of NCells for which the UE has triggered a measurement report with a flag set as described above, not simply for any NCell from the list in message 406. It will be appreciated that in certain embodiments the UE may not be aware of the indices current for the NCell, in the event that neither message 406 or 408 is received or transmitted. In such a case the UE may request on-demand SI for one or more NCells without knowing the current indices. The UE may still provide currently held indices. FIG. 4 shows this being provided as a list of requested identifiers and associated indices (one or more indices for at least one of the identifiers) though as discussed above in connection with FIG. 2 if no index is held this will not be included for an identifier. Message 410 may include UE capabilities. For a UE in connected mode the UE will have already provided its UE capabilities so this may already be known to the network. However, there may be circumstances in which the UE capabilities are pertinent to the on-demand provision of SI and so this may be included.

In response, the serving eNB 402 sends a response message SI-OnDemandResponseNCell 412, which is generally the same as message 204 of FIG. 2 except for the inclusion of the Neighbouring Cell list/NCell list for which the content (that is, the SI parameter values) and the respective identifier and index pairs is valid.

Following receipt of message 412 the UE is in a position to configure the NCell as an SCell at step 414

Referring now to FIG. 5, this shows an alternative for the on-demand provision of SI in an IRAT aggregation situation. At step 504 the UE 500 provides a MeasurementReport to the network, specifically a PCell 502. The MeasurementReport will include conventional measurement results information reporting on the characteristics of NCells that will not be further described here. The UE 500 further indicates in the MeasurementReport the identifiers of relevant SI parts (including as appropriate the respective indices for versions it has available to enable delta signalling) for one or more NCells that newly triggered a measurement event. This is illustrated in FIG. 5 as a list of stored identifier and index pairs (where the indices are locally stored). Portions of the MeasurementReport 506 are generally similar to message 202 of FIG. 2 and so will not be described again. The UE sends a measurement report because for one or more NCells an event condition is met. The UE is aware that it is to acquire SI for such NCells due to one or more flags being set in the measurement configuration previously provided to the UE. The triggering flag would be set by the network in a preceding reconfiguration message including a measurement configuration parameter.

In response, for each of the 5G cells to add, the network provides the on-demand SI parameter values in a Reconfiguration message 506, that is used to configure/add the 5G cell as a SCell. As appropriate, delta signalling may be applied by the network if message 504 includes one or more values for an identifier to indicate an SI parameter value set held by the UE. FIG. 5 shows message 508 including a list of applicable SI parts comprising identifiers, indices and SI parameter values applicable in that part off the network. The message may be generally similar to message 204 described above except for the inclusion of message parts SCellToAddModList and SCell config. SCellToAddModList concerns the one or more NCells that are to be configured for IRAT aggregation. For each, the SCell configuration is provided by means of the dedicated configuration and the SI for that cell.

FIG. 6 provides a schematic diagram of the structure of a 5G base station 400 which is arranged to operate in accordance with the examples of the present invention described above. The 5G base station 600 includes a transmitter 602 arranged to transmit signals to a UE; a receiver 604 arranged to receive signals from the UE; and a controller 606 arranged to control the transmitter and receiver and to perform processing such as in accordance with the above described method of providing SI to the UE.

FIG. 7 provides a schematic diagram of the structure of a UE 700 which is arranged to operate in accordance with the examples of the present invention described above. The UE 700 includes a transmitter 702 arranged to transmit signals to the 5G base station; a receiver 704 arranged to receive signals from the 5G base station; and a controller 706 arranged to control the transmitter and receiver and to perform processing such as in accordance with the above described method of requesting SI.

Although in FIGS. 4 and 5 the transmitter, receiver, and controller have been illustrated as separate elements, any single element or plurality of elements which provide equivalent functionality may be used to implement the examples of the present invention described above.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The various embodiments of the present invention may also be implemented via computer executable instructions stored on a computer readable storage medium, such that when executed cause a computer to operate in accordance with any other the aforementioned embodiments.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be used without departing from the scope of the invention, which is defined in the accompanying claims.

The invention claimed is:

1. A method by a base station in a wireless communication network, the method comprising:
   transmitting, to a terminal, a list of one or more first identifier and index pairs, each of the one or more first identifier and index pairs including an identifier and an index, wherein the identifier is associated with system information (SI) parameters, and the index indicates SI parameter values for SI parameters corresponding to the identifier;
   receiving, from a terminal, an SI request message including a second identifier and index pair including an identifier and an index, respectively corresponding to SI parameters and SI parameter values required by the terminal based on the list of the one or more first identifier and index pairs transmitted to the terminal;
   determining SI parameter values to be transmitted to the terminal, based on the list of the one or more first identifier and index pairs transmitted to the terminal and the identifier and the index included in the second identifier and index pair received from the terminal; and
   transmitting, to the terminal, a response message including the determined SI parameter values.

2. The method of claim 1, wherein the identifier corresponds to each of groups of SI parameters partitioned from SI, and wherein the SI is partitioned into the groups of SI parameters based on at least one of a frequency of changing SI parameters, a trigger condition of changing SI parameters and an area scope within which the SI parameter is valid.

3. A base station in a wireless communication network, the base station comprising:

a transceiver configured to transmit and receive a signal; and a controller configured to:

control the transceiver to transmit, to a terminal, a list of one or more first identifier and index pairs, each of the one or more first identifier and index pairs including an identifier and an index, wherein the identifier is associated with system information (SI) parameters, and the index indicates SI parameter values for SI parameters corresponding to the identifier, control the transceiver to receive an SI request message from a terminal, the message including a second identifier and index pair including an identifier and an index, respectively corresponding to SI parameters and SI parameter values required by the terminal based on the list of the one or more first identifier and the index pairs transmitted to the terminal, determine SI parameter values to be transmitted to the terminal, based on the list of the one or more first identifier and index pairs transmitted to the terminal and the identifier and the index included in the second identifier and index pair received from the terminal, and control the transceiver to transmit. to the terminal., a response message including the determined SI parameter values.

4. The base station of claim 3, wherein the identifier corresponds to each of groups of SI parameters partitioned from SI, and wherein the SI is partitioned into the groups of SI parameters based on at least one of a frequency of changing SI parameters, a trigger condition of changing SI parameters and an area scope within which the SI parameter is valid.

5. A method by a terminal in a wireless communication network, the method comprising:

receiving, from a base station, a list of one or more first identifier and index pairs, each of the one or more first identifier and index pairs including an identifier and an index, wherein the identifier is associated with system information (Si) parameters, and the index indicates SI parameter values for SI parameters corresponding to the identifier;

transmitting, to a base station, an SI request message including a second identifier and index pair including an identifier and an index, respectively corresponding to SI parameters and SI parameter values required by the terminal based on the list of the one or more first identifier and index pairs received from the base station; and receiving, from the base station, a response message including SI parameter values in response to the SI request message.

6. The method of claim 5, wherein the SI parameter values to be received from the base station is determined by the base station based on the list of the identifier and the index transmitted to the terminal and the identifier and the index received from the terminal.

7. The method of claim 5, wherein the identifier is corresponding to each of groups of SI parameters partitioned into SI, the groups of SI parameters are partitioned based on at least one of factors comprising a frequency of changing SI parameters, a trigger condition of changing SI parameters and an area scope within which the SI parameter is valid.

8. A terminal in a wireless communication network, the terminal comprising:

a transceiver configured to transmit and receive a signal; and a controller configured to:

control the transceiver to receive, from a base station, a list of one or more first identifier and index pairs, each of the one or more first identifier and index pairs including an identifier and an index, wherein the identifier is associated with system information (SI) parameters, and the index indicates SI parameter values for SI parameters corresponding to the identifier, control the transceiver to transmit an SI request message to a base station, the SI request message including a second identifier and index pair including an identifier and an index, respectively corresponding to SI parameters and SI parameter values required by the terminal based on the list of the one or more first identifier and index pairs received from the base station, and control the transceiver to receive, from the base station. a response message including SI parameter values in response to the SI request message.

9. The method of claim 8, wherein the SI parameter values to be received from the base station is determined by the base station based on the list of the identifier and the index transmitted to the terminal and the identifier and the index received from the terminal, wherein the identifier is corresponding to each of groups of SI parameters partitioned from the SI, and wherein the SI is partitioned into the groups of SI parameters based on at least one of a frequency of changing SI parameters, a trigger condition of changing SI parameters and an area scope within which the SI parameter is valid.

\* \* \* \* \*